United States Patent [19]

Akatsuka et al.

[11] Patent Number: 5,339,300
[45] Date of Patent: Aug. 16, 1994

[54] OPTICAL DATA RECORDING APPARATUS AND AN OPTICAL DATA RECORDING/REPRODUCING METHOD PERFORMING SERVO CONTROL WITH BOTH A RECORDING LIGHT BEAM AND A REPRODUCING LIGHT BEAM

[75] Inventors: Yuichiro Akatsuka; Horiguchi Toshio, both of Tokyo, Japan

[73] Assignee: Olympus Optical Co., Ltd., Tokyo, Japan

[21] Appl. No.: 7,625

[22] Filed: Jan. 21, 1993

[30] Foreign Application Priority Data

Jan. 24, 1992 [JP] Japan .................................. 4-010808
May 14, 1992 [JP] Japan .................................. 4-121934

[51] Int. Cl.$^5$ .................................................. G11B 7/09
[52] U.S. Cl. ............................... 369/44.29; 369/44.32; 369/44.34; 369/44.35; 369/44.38; 235/454
[58] Field of Search ............... 369/44.23, 44.25, 44.26, 369/44.29, 44.32, 44.34, 44.35, 44.36, 44.37, 44.38, 44.41, 54, 58; 235/454, 456

[56] References Cited

U.S. PATENT DOCUMENTS

| | | | |
|---|---|---|---|
| 4,459,690 | 7/1984 | Corsover et al. | 369/44.38 X |
| 4,500,777 | 2/1985 | Drexler . | |
| 4,571,712 | 2/1986 | Romano et al. . | |
| 4,644,160 | 2/1987 | Arimoto et al. . | |
| 4,695,992 | 9/1987 | Aoi | 369/44.38 |
| 4,730,293 | 3/1988 | Pierce et al. . | |
| 5,033,040 | 7/1991 | Fujita | 369/44.37 |
| 5,113,387 | 5/1992 | Goldsmith et al. | 369/44.38 |
| 5,150,347 | 9/1992 | Yanagi | 369/44.38 X |
| 5,197,058 | 3/1993 | Bell, Jr. et al. | 369/44.34 X |
| 5,235,584 | 8/1993 | Yoshio et al. | 369/44.37 X |

FOREIGN PATENT DOCUMENTS

WO 89/00742 1/1989 PCT Int'l Appl. .

OTHER PUBLICATIONS

"High Speed Optical Card Reader/Writer using Two Optical Sources" Ishida et al; pp. 4–265; National Autum Conference Handout Document 1989 IECE Japan (Institute of Electronics and Communication Engineers of Japan), C-325.
Patent Abstracts of Japan, vol. 9, No. 48; Feb. 28, 1985 & JP-A-59 186,141 (Fujitsu KK).

*Primary Examiner*—W. R. Young
*Attorney, Agent, or Firm*—Frishauf, Holtz, Goodman & Woodward

[57] ABSTRACT

An apparatus performs servo control of a recording light beam by using a reproducing light beam. The reproducing light beam, which does not destroy the recording material of an optical card, is emitted from a reproducing LD to the optical card. The position of the reproducing light beam is controlled by a control unit. A light beam which does not destroy the recording material of the optical card is emitted from a recording LD to the optical card. The position of the light beam from the recording LD is detected by a recording PD and the detected error signal is stored in the control unit. The reproducing light beam is emitted again from the reproducing LD to the optical card together with emitting the recording light beam, which can destroy the recording material of the optical card, from the recording LD. The position of the recording light beam is controlled by the control unit based on the reflected light beam of the reproducing light beam from the optical card and on the stored signal in the control unit.

23 Claims, 10 Drawing Sheets

OPTICAL DATA RECORDING APPARATUS AND AN OPTICAL DATA RECORDING/REPRODUCING METHOD PERFORMING SERVO CONTROL WITH BOTH A RECORDING LIGHT BEAM AND A REPRODUCING LIGHT BEAM

BACKGROUND OF THE INVENTION

1. Field of the Invention

The present invention relates to an optical data recording apparatus and an optical data recording/reproducing method performing servo control of a recording light beam.

2. Description of the Related Art

Generally, an optical recording medium has started to be used for recording a large amount of data since recording density of the optical recording medium is extremely higher than that of a magnetic recording medium. For example, an optical card has a storage capacity several thousand times to ten thousand times as compared with a magnetic card. Similar to a WORM type optical disk, the optical card is not rewritable, but the storage capacity is large, that is, 1 to 2M bytes. Therefore, it can be considered that the optical card is used in applications that preserve data on an individual heath management card, a prepaid card, and management of clients. The experiments in such applications have been already started in this technical field. Moreover, the use of the WORM type optical disk has been expanded in a document file, and the optical magnetic disk incorporated into a personal computer has been put on the market.

In an optical data recording/reproducing apparatus for an optical recording medium such as an optical card, an optical head is reciprocated relatively to the optical card to perform data recording/reproducing. Recording speed/reproducing speed is determined by a relative speed between the optical head and the optical card. Due to this, illuminating only a single track to record/reproduce data on/from the track cannot increase the recording speed/reproducing speed so much.

In order to solve the above problem, for example, as disclosed in U.S. Pat. No. 4,730,293, there is known a data recording/reproducing apparatus in which a plurality of tracks are simultaneously illuminated to read data from the plurality of tracks at the same time, thereby increasing the reading speed.

Moreover, for example, in "High Speed Optical Card Reader/Writer using Two Optical Sources" National Autumn Conf. Handout Document 1989 IECE Japan (Institute of Electronics and Communication Engineers of Japan), C-325, there is disclosed a data recording/reproducing apparatus using a different light source for recording and for reproducing. The structure of the optical head in the apparatus disclosed in the above document will be explained with references to FIGS. 1 to 3.

As shown in FIG. 1, a data recording section 4 and ID sections 6 are formed on an optical card 2 to be used in this apparatus. The data recording section 4 has a plurality of tracks extending in a longitudinal direction of the optical card 2 in parallel to each other. The ID sections 6 are arranged on both sides of the data recording section 4, respectively, and address data on each track is recorded therein.

On the other hand, as shown in FIG. 2, an optical head in this apparatus comprises a recording laser diode (hereinafter called recording LD) 10 serving as a light source for recording, and a reproducing LED 12 serving as a light source for reproducing.

Light emitted from the recording LD 10 is changed to a parallel light by a collimator lens 14. After the light is transmitted through a polarization beam splitter (PBS) 16, the light is focused by an objective lens 18 on the track of the optical card 2 serving as an optical recording medium.

Light emitted from the reproducing LED 12 is changed to a parallel light by a collimator lens 20. Thereafter, the parallel light is reflected by PBS 16, and focused on the track of the optical card 2 by the objective lens 18.

The light, which is reflected on the optical card 2 and sent from the reproducing LED 12, is changed to a parallel light by the objective lens 18, and partially reflected by PBS 16. Thereafter, the light is totally reflected by a mirror 22, transmitted through an image-forming lens 24, and totally reflected by a mirror 26 again. The light is split into light transmitted through a beam splitter (BS) 28, and light which is reflected on a beam split surface of BS 28, by the beam splitter BS 28. The transmitted light is inputted into a lead/tracking error detector (Tr-PD) 30, and the reflected light is inputted into a focus error detector (Fo-PD) 32.

The Tr-PD 30 comprises two triangle photodetectors 34 and 36 (hereinafter called "reproducing error device"), which are arranged such that their apexes are faced to each other and detect a tracking error at the time of reproduction, and two rectangular data detection devices 38 and 40, which are arranged at the upper and lower portions of the reproduction error devices 34 and 36.

A light spot irradiated on the optical card 2 is projected on the Tr-PD 30 as shown by reference numeral 42 in FIG. 3. An image 44a of a guide track 44 is formed on the reproduction error devices 34 and 36, and an image 46a of data pit 46 is formed on the data detecting device 40.

The detection of tracking error is performed by detecting the balance of light and shade of the image formed on the respective upper and lower reproduction error devices 34 and 36.

At this time, images of upper and lower tracks of the guide track 44 are formed on two data detection devices 38 and 40, thereby making it possible to obtain data of two tracks at the same time. It is noted that data recording is performed by the recording LD 10. In FIG. 3, a reference numeral 48 shows a light spot by the recording LD 10, that is, a recording light spot.

The detection of a focus error is performed by use of a reproduction light spot formed by the reproduction LED 12 shown in FIG. 2. In this case, the optical axis of the reproduction of light spot is shifted to the optical axis of the objective lens 18. The shift makes the light spot on the Fo-PD 32 move according to the movement of the objective lens 18. If the objective lens is moved to a lower portion in the figure, the spot formed on the Fo-PD 32 is moved right and left in the figure. The amount of movement of the spot on the Fo-FD 32 depends on the distance between the objective lens 18 and the optical card 2. This movement can be used for focus control. That is, the focus control can be performed by arranging the Fo-PD 32 at the position where the spot is formed in a proper focal position and by controlling the objective lens 18 such that the spot stays at the proper position.

However, even in the optical data recording/reproducing apparatus, the detection of a tracking error and that of a focus error are performed by use of the image formed by the reproduction LED 12. Due to this, it is important that there occurs no shift between a relative positional relationship between an optical spot 48 of the recording LD 10 and a light spot 49 of the reproduction LED 12 which is to be used for the tracking control and the focus control. The relative positional relationship between both spots 48 and 49 depends on the relative positional relationship between the recording LD 10 and the reproducing LED 12. The positional relationship between both light sources are influenced by a temperature change, a secular change, and others.

Even if the amount of the relative positional change between the recording LD and reproducing LED due to the temperature of the material where both light sources are provided is only 1 μm to several μm, the position, which is in a plane perpendicular to the track, of the optical spot formed by the recording LD is largely shifted.

For example, in the tracking, the light spot 48 of the recording LD 10 is not positioned at the center of the track and shifted up and down. If the light spot 48 is shifted, the recording position of the pit is also shifted. Generally, in the optical recording, the distance between the tracks is about several μm to 10 μm. Therefore, even if the above shift is not very large, the image of the pit overflows the reproducing devices 38 and 40 at the time of reproducing the recorded data and thus there is no possibility that data can be reproduced at worst.

In the focusing, the focal position of the light spot of the recording LD is largely shifted, the pit cannot be normally recorded and the recorded pit size is unstable. These points result in lowering reliability of recorded data and has a large influence on the recording/reproducing operation.

Moreover, there is a case that the optical axes of both light spots 48 and 49 to be focused on the optical card 2 are shifted due to assembly accuracy of the optical head. In this case, it is necessary to adjust the relative members in the optical head, resulting in increasing the cost and lowering reliability.

In order to solve the above disadvantages, it can be considered that the focus control and tracking control are performed by light emitted from the recording LD and reflected by the recording medium.

However, in this case, regarding the amount of the reflected light, the average amount of light to be emitted at the large output such that the light spot of the recording LD forms the pit is more than 10 times as much as the case where no recording is performed. Also, at the time of forming the pit on the recording medium, the change of reflection factor occurs by the pit and the reflected light is largely changed. Therefore, it is necessary to provide complicated circuits such as an AGC (auto gain control circuit) and a gain switching circuit in the focus control circuit and the tracking control circuit, and this causes an increase in manufacturing cost.

SUMMARY OF THE INVENTION

The present invention has been made in consideration of the above-mentioned problems, and an object of the present invention is to provide an optical data recording apparatus, which can normally record data to a recording medium even if a relative shift is generated between a reproducing light spot and a recording light spot, and which has a simple structure.

Additional objects and advantages of the invention will be set forth in the description which follows, and in part will be obvious from the description, or may De learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

1. First Embodiment

A first embodiment of an optical data recording/reproducing apparatus according to the present invention will be explained with reference to FIGS. 4 to 7.

OPTICAL HEAD

The structure of an optical system of this embodiment will be explained along a flow of a light beam.

Figure 4:
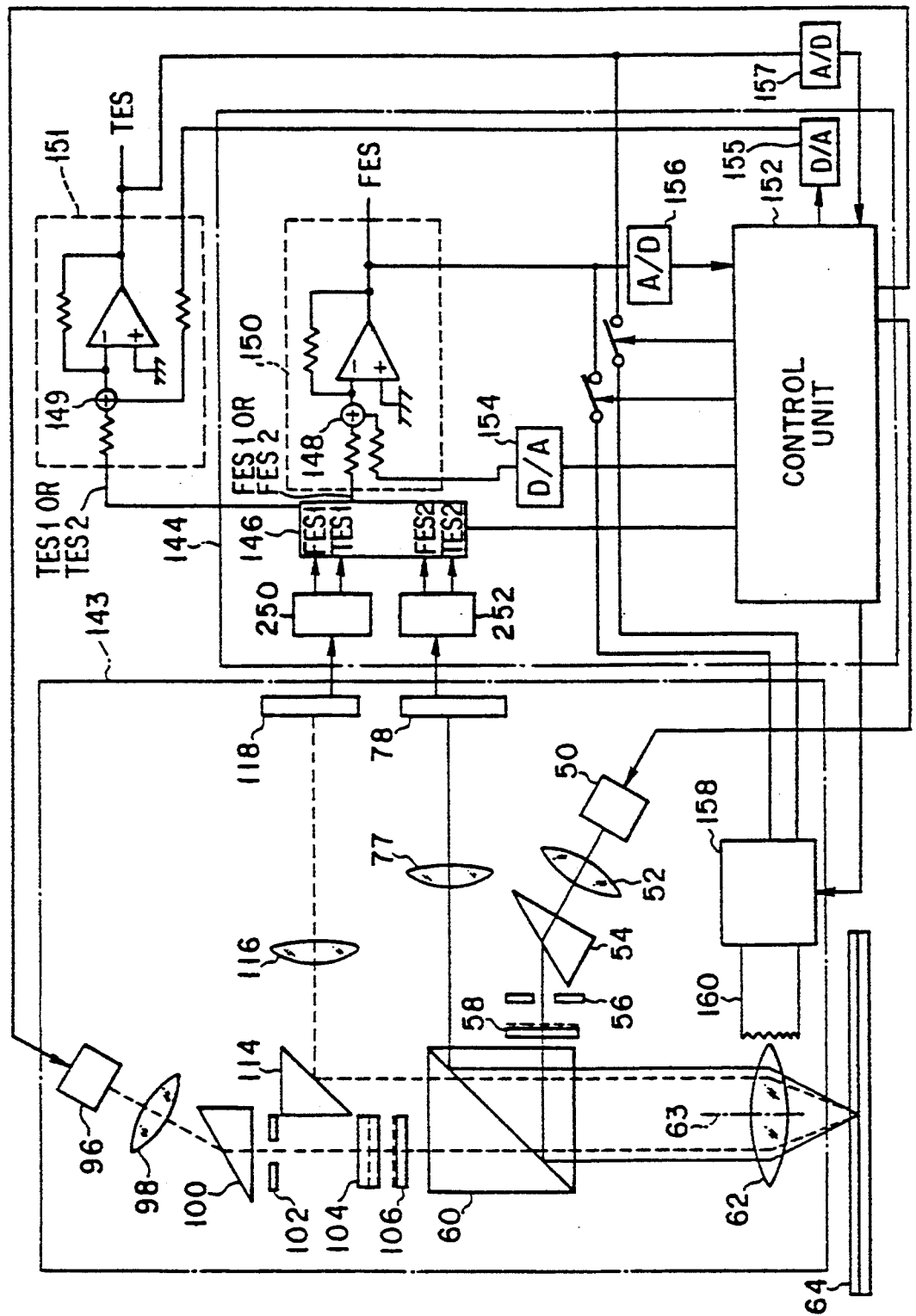
FIG. 4 is a structural view showing an optical head and a control system, which are incorporated into an optical data recording/reproducing apparatus of a first embodiment according to the present invention.

In FIG. 4, reference numeral 50 shows a recording semiconductor laser diode (hereinafter called "recording LD"), which is a recording light source. A recording light beam generated by the recording LD becomes a substantially elliptic parallel beam at a collimator lens 52. The parallel beam is reduced in only a long axis direction of the ellipse by a shaping prism 54 so as to be shaped to substantially a round shape. Moreover, the diameter is decreased by a circular diaphragm 56 so as to obtain a predetermined value of the spot size of the recording light beam. Thereafter, the beam is divided into three beams, that is, a zeroth diffracted light beam and ± primary diffracted light beams by a diffraction grating 58.

Since these three circular beams are formed of S-polarizing components due to the property of the recording LD 50, almost all parts of respective beams are reflected on a reflection surface of a polarizing beam splitter 60, and inputted into a position off-center from the central position of an objective lens 62, that is, a left half portion of the objective lens 62 in the figure.

Figure 5:
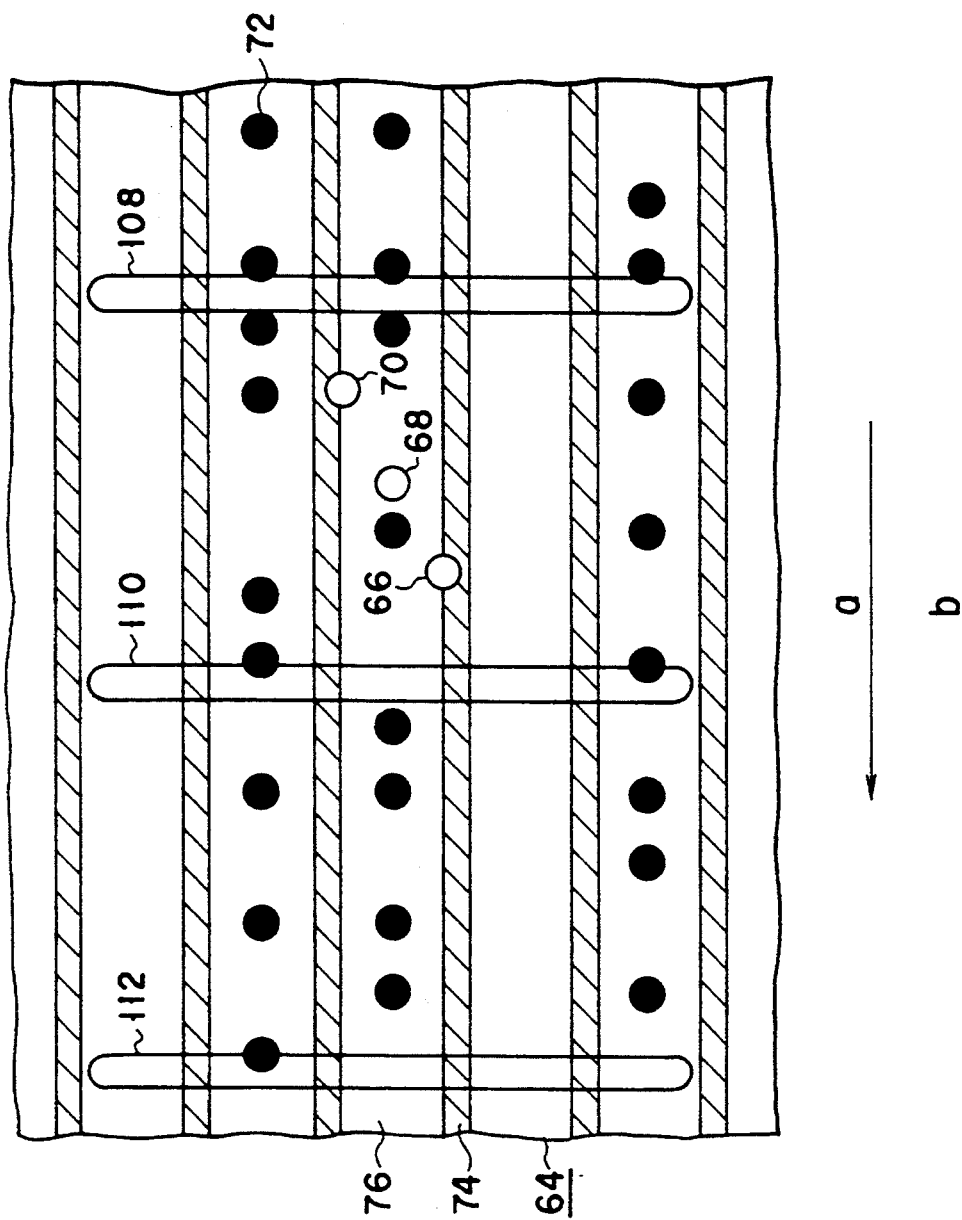
FIG. 5 is an upper front view showing a recording light beam on the optical card and three spots by a diffracted light of a reproducing light beam.

These light beams are focused on an optical card 64 by the objective lens 62, and used as three light spots 66, 68, and 70 as shown in FIG. 5. The zeroth light spot 68 is positioned at a central portion, and ± primary light spots 66 and 70 are positioned at both sides of the zeroth light spot 68, respectively. The zeroth light spot 68 is used to record data and to detect a focus error, and ± primary light spots 66 and 70 are used to detect a tracking error. It is noted that the diffraction grating 58 is formed such that intensity of the ± primary light beams is sufficiently smaller than that of the zeroth light beam.

At the time of recording, the recording LD 50 (FIG. 4) emits a light beam with intensity enough to form a pit 72. In the optical card 64, energy density is locally enhanced by the central light spot 68, which is the zeroth light beam, so that a thermal irreversible change is generated in a recording layer of the optical card 64 to form the pit 72. Since the ± primary light spots 66 and 70 are sufficiently weaker than the zeroth light spots 68, no pit is formed.

At the time of recording, the optical card 64 is moved to a direction of an arrow a or an arrow b along a track guide 74. If the recording LD 50 emits a light beam in a state that a pulse modulated in accordance with data to be recorded, the light beam is applied to the optical card 64, the pit 72 is sequentially generated on the optical card 64 and data is recorded on a data recording track 76 as a pit string.

The focus error detection and the tracking error detection of the recording light beam are performed as follows:

That is, three diffracted light beams reflected on the optical card 64 shown in FIG. 4 pass through a half area opposite to the incident side of the objective lens 62, reflected on the reflection surface of the polarizing beam splitter 60 and inputted into an image-forming lens 77, and an image is formed in a recording photodetector (hereinafter called "recording PD") 78.

Figure 6:
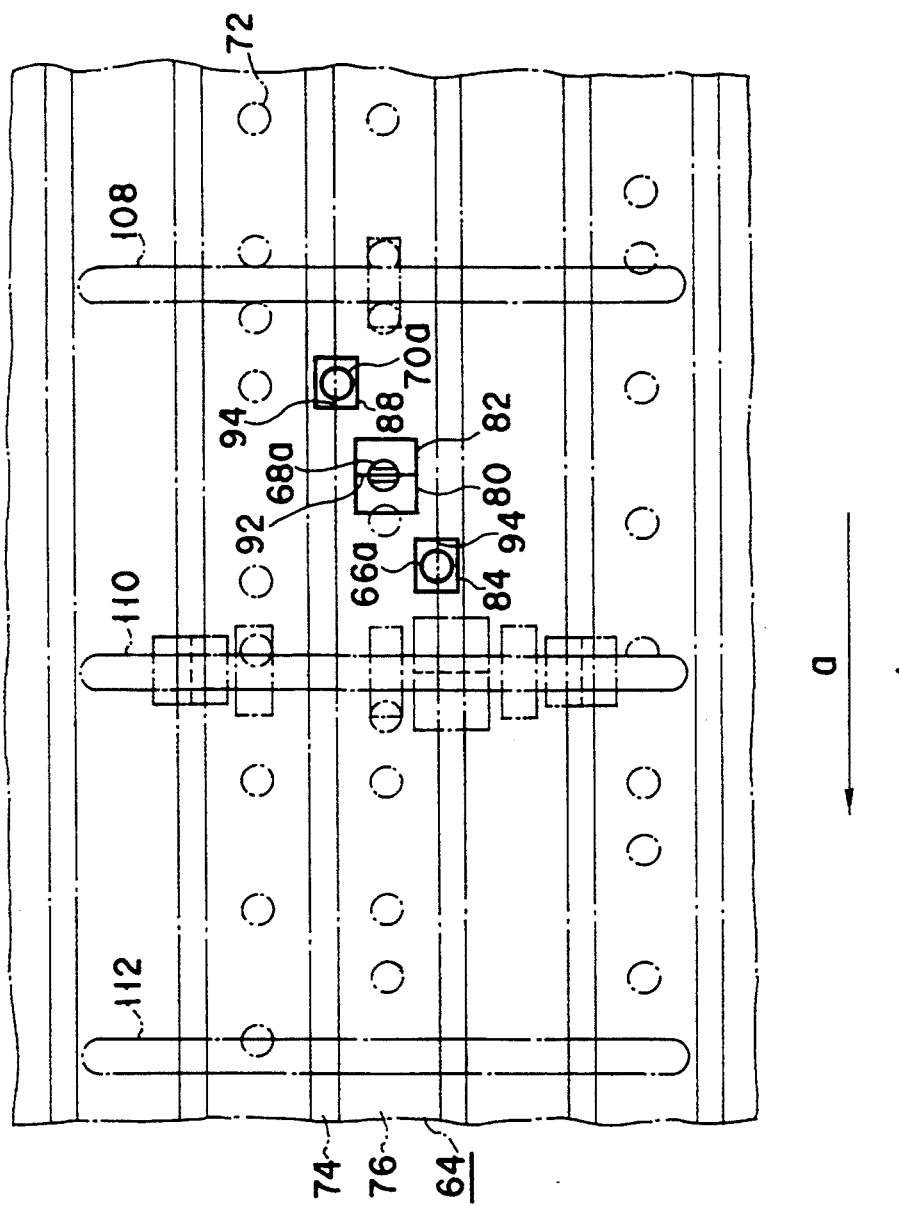
FIG. 6 is an upper front view showing spots of a zeroth diffracted light beam and ± primary diffracted light beams for a recording light beam projected on a recording PD.

As shown in FIG. 6, a pair of photodetectors (Fo-device) 80 and 82 for focus error detection, and a pair of photodetectors (Tr-device) 84, 88 are provided on the recording PD 78. A boundary line 92 between Fo-devices 80 and 82 extends in a direction perpendicular to the track 76, and a boundary line 94 between Tr-devices 84, 88 extends in a direction parallel to the track 76. An image 68a of the zeroth light spot is inputted to Fo-devices 80 and 82, and images 66a and 70a of ± primary light spots 66 and 66 are respectively inputted to Tr-devices 84, 88.

These three spot images 66a, 68a, and 70a are formed on suitable positions on Fo-devices 80, 82, and Tr-devices 84, 88 respectively in a state that neither tracking error nor focus error exist. FIG. 6 shows the suitable spot state.

In an optical system of the apparatus of this embodiment, the recording light beam is inputted to an off-center position from the central axis of the objective lens 62. As a result, in the case that focus shift occurs, the image of the recording light beam spot is moved to the direction parallel in a track from the suitable position.

Fo-devices 80 and 82 detect the shift of the position of the recording light beam due to the focus shift as an output difference of the respective devices 80 and 82, and generate a recording focus error signal. By the focus error signal, it can be checked whether or not the recording light beam is in a suitable focus state.

Moreover, in the case that tracking shift occurs in the recording light beam, the image of the spot of the recording light beam is moved in a direction perpendicular to the track from the suitable position.

A pair of Tr-devices 84, 88 detects the shift of the position of the recording light beam due to the tracking shift as an output difference of the respective devices 84, 88 and generate a recording tracking error signal. By the tracking error signal, it can be checked whether or not the recording light beam is in a suitable tracking state.

On the other hand, as shown in FIG. 4, a reproducing light beam is emitted from a reproducing semiconductor laser diode (hereinafter called "reproducing LD") 96 which is a reproducing light source. The reproducing light beam becomes a substantially elliptic parallel beam at a collimator lens 98. The parallel beam is expanded in only a short axis direction of the ellipse by a shaping prism 100 to be shaped to substantially a round shape. Moreover, the diameter of the parallel beam is decreased by a circular diaphragm 102 so as to obtain a predetermined value of the spot size of the reproducing light beam.

The circular parallel beam receives reflection in only one way in a plane perpendicular to the optical axis of the beam by a flat concave cylindrical lens 104, and is slightly diverged in the direction. Moreover, the beam is divided into three beams, that is, one zeroth diffracted light beam, and two primary diffracted light beams by diffraction grating 106. At this time, the beam diverged direction by the cylindrical lens 104 and the beam diffracted direction by diffraction grating 106 are substantially perpendicular to each other.

Since these three beams are formed of P-polarizing components due to the property of the reproducing LD 96, the beams are transmitted through substantially all the polarizing beam splitter 60 and inputted to a position off-center from the central position of the objective lens 62, that is, a left half portion of the objective lens 62 in the figure. These beams are focused on the optical card 64 by the left half portion of the objective lens 64, diverged by the cylindrical lens 104, so that three spots are shaped to be expanded in a predetermined direction.

In FIG. 5, these three spots are shown by reference numerals 108, 110, and 112, respectively. Among these three spots, the zeroth diffracted light spot 110 is positioned at a central portion, and ± primary diffracted light spots 108 and 112 are positioned at both sides of the zeroth diffracted light spot 110, respectively. The above-mentioned recording light spots 66, 68, and 70 of the light beam are positioned between the zeroth diffracted light spot 110 of the reproducing light beam and one of ± primary diffracted light spots 108 or 112 (in FIG. 5, ± primary light spot 108).

At the time of adjusting the assembly of the optical head, the relative positional relationship between these spots is set by relatively applying a difference in an angle between the optical axes of the recording light beam and of the reproducing light beam before both light beams are inputted into the objective lens.

As mentioned above, three reproducing beam spots 108, 110, and 112 are regularly reflected by the optical card 64 in a state were they are light-modulated by the presence of the track guides 74 and the pits 72. The reflected light beams pass through the objective lens 62 (FIG. 4) in an opposite direction, and are guided to the polarizing beam splitter 60 in the form of a substantially parallel light beam. The reflected light beams substantially maintain as P-polarizing light beams due to the regular reflection by the optical card 64, and almost all of their respective parts transmit through the polarizing beam splitter 60, and pass through a reflection mirror 114, and are guided to a focusing lens 116.

Light beams condensed by the condenser lens 116 enlarge spot images on the optical card, and project the images on the light receiving surface of a reproducing photodetector (hereinafter called "reproducing PD") 118. Similar to the recording light beam, this optical system performs the focus detection by an off-axis method.

Figure 7:
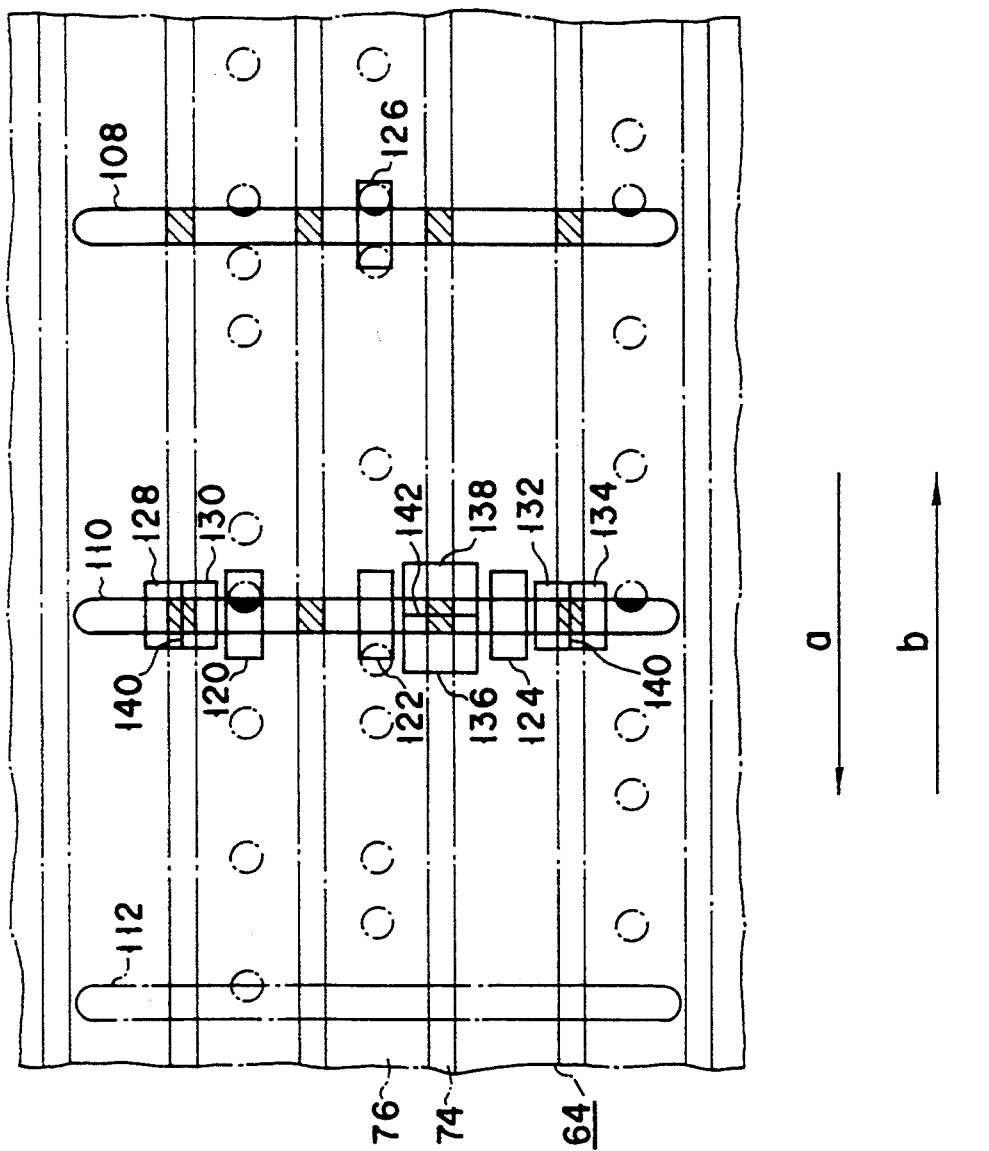
FIG. 7 is an upper front view showing spots of a zeroth diffracted light beam and ± primary diffracted light beams for a reproducing light beam projected on a reproducing PD.

In order to detect the movement of the image of the reproducing light beam spot due to the focus shift, as shown in FIG. 7, there are provided four data detection devices 120, 122, 124, 126, two pairs of photodetectors 128, 130; 132, 134 for tracking error detection (Tr-devices), and a pair of photodetectors 136, 138 for focus error detection (To-devices) on the reproducing PD 118. Boundary lines 140 between Tr-devices 128 and 130; 132 and 134 extend parallel to the track, and a boundary line 142 between To-devices 136 and 138 extends perpendicular to the track.

Three spot images 108, 110 and 112 of reproducing light beams are formed on appropriate positions of the photodetectors in a state that neither track shift nor focus shift exists.

Tr-devices 128, 130, and 132 and 134 detect the change of the position of the image of the track guide due to the track shift as a variation of amount of receiving light to generate a tracking error signal. Definitely, the tracking error signal is obtained from the following operation expression:

{(the output of the device 128)—(the output of the device 130)}+{(the output of the device 132)—(the output of the device 134)}

Fo-devices 136 and 138 detect the positional shift of the reproducing beam due to the focus shift as a difference between Fo-devices 136 and 138 to generate a focus error signal.

Moreover, at the time of reproducing, data detection devices 120, 122, and 124 detect the presence of the pits of three tracks from the variation of the amount of light to output a reproducing signal.

An optical head 143 of the apparatus of the above embodiment is formed of the above-explained members.

CONTROL SYSTEM

As shown in FIG. 4, the output of the reproducing PD 118 and that of the recording PD 78 are changed by first and second arithmetic circuits 250 and 252 into focus and tracking signals to be inputted to a selector 146 in a focus/tracking error detection circuit (control system) 144. The focus/tracking error detection circuit 144 comprises the selector 146, two differential amplifiers 150 and 151 respectively having adders 148 and 149, a control unit 152, D/A converters 154 and 155, A/D converters 156 and 157, and the first and second arithmetic circuits 250 and 252.

The selector 146 selects either a pair of focus and tracking error signals FES1 and TES1, which are obtained from the reproduction light beam, or a pair of focus and tracking error signals FES2 and TES2, which are obtained from the recording light beam. The selected pair is divided into a focus error signal and a tracking error signal. The focus error signal is inputted to the differential amplifier 150 and the tracking error signal is inputted to the differential amplifier 151. Predetermined signals are inputted to the differential amplifiers 150 and 151 (the adders 148 and 149) from the control unit 152 through the D/A converter 154 and 155.

One of the outputs of the selector 146 and one of the predetermined signals inputted to the adders 148 and 149 are added each other, so that a focus error signal (hereinafter called "FES") and a tracking error signal (hereinafter called "TES") can be obtained.

On one side, FES and TES are amplified by a power amplifier 158, and inputted to an actuator 160 for driving the objective lens 62. On the other side, FES and TES are inputted to the control unit 152 through the A/D converters 156 and 157. It is noted that the switching of the selector 146 is performed by the control unit 152.

OUTLINE OF THE CONTROL OPERATION

An operation of the control system of FIG. 4 will be explained as follows.

The operation can be divided into the following three modes.

Mode 1: A focusing control and tracking control mode of the reproducing light spot by use of focus and tracking error signals obtained from the reproducing light spot (control of general reproducing light spot) (At this time, the recording light beam is turned off);

Mode 2: A measuring mode of the amount of offset;

Mode 3: A focusing control and tracking control mode of the reproducing light spot by use of focus and tracking error signals obtained from the reproducing light spot, considering the amount of offset obtained in mode 2.

EXPLANATION OF MODE 1

If power is supplied to the optical data recording/reproducing apparatus, the operation is in the mode 1. A control unit 152 controls the reproducing LD 96 to emit the reproducing light beam. The reproducing light beam is reflected on the optical card 64, and converted to an electrical signal by the reproducing PD 118. The converted signal is calculated by the first arithmetic circuit 250, and changed to a focus error signal FES1 and a tracking error signal TES1. The selector unit 146 selects FES1 and TES1, which are the outputs of the calculation circuit A, by the instruction of the control unit 152, and the selected outputs are inputted to the differential amplifiers 150 and 151, respectively. At this time, since control unit 152 outputs all zeros to the D/A converters 154 and 155, the differential amplifiers 150 and 151 amplify only FES1 and TES1 and output the amplified FES1 and TES1. The outputs of the differential amplifiers 150 and 151 are passed through a servo ON/OFF SW closed by the control unit 152, and supplied to the objective lens driving unit 160 through the power amplifier 158, so that the objective lens 62 is driven. That is, the focusing and tracking controls of the reproducing light spot by use of the focus and tracking error signals obtained from the reproducing light spot are performed. In this state, the reproducing light spot is correctly positioned at the track on the recording medium of the optical card 64. Also, both values of the FES1 and TES1 obtained by the first arithmetic circuit 250 become zero.

The reproducing operation, which is executed after the control unit 152 receives a command for performing the reproducing operation from a host computer such as a personal computer, is also performed in mode 1.

EXPLANATION OF MODE 2

If the optical data recording/reproducing apparatus receives a command for performing a recording operation from the host computer, the apparatus moves the optical spot to an objective track on the optical card, and performs the real recording operation, that is, an emitting operation of the recording beam modified by the recording signal when the optical spot is moved to the objective position. The mode 2 is performed since the control unit 152 receives the command till the real recording operation is performed. Therefore, for example, the mode 2 is performed with any timing described below:

1. just after receiving the command;
2. during seek control of the optical head to an object track;
3. during the time till a card transfer speed at the time of reciprocating the optical card is made constant; and
4. at the time when the optical card stops at the driving end.

Since the control unit 152 controls the operation of the above-mentioned timing 1 to 4, the execution timing can be recognized. Therefore, the control unit 152 adjusts to any one of above timing 1 to 4, and executes mode 2.

In mode 2, the reproducing LD 96 emits the reproducing light beam, and the objective lens 62 is servo-controlled based on the detected FES1 and TES1 similar to mode 1.

Under this state, the control unit 152 also drives the recording LD 50. The recording LD 50 is emitted so as not to obtain strong power destroying the medium. The power may be power which is the same as the power of the reproducing light beam from the reproducing LD 96. The light beam of the recording LD 50 is irradiated to the optical card 64, and the reflected light is detected by the recording PD 78. The selector is switched to select the arithmetic circuit 252 at the same time the recording LD 50 is driven. Focus and track error signals FES2 and TES2, which are detected based on the light beam from the recording LD 50, are converted to digital signals through the differential amplifiers 150 and 151 and the A/D converters 156 and 157, and inputted to the control unit 152.

If there is no offset, the values of FES2 and TES2 are zero similar to those of FES1 and TES1. The values which are other than zero show the amount of offset. The control unit 152 temporarily stores the inputted values of FES2 and TES2.

It is noted that the mode 2 may be performed at the time not after the recording command is generated but at the time of power-on.

EXPLANATION OF MODE 3

That the reproducing light reaches an objective recording track is detected from an address signal in a data signal obtained from the data detection device 122 in the reproducing PD 118. At the time of this detection, the optical head 143, which has been moved by a driving motor (not shown) in a direction where the optical head 143 crosses the track, is stopped. The optical card 64 is driven in the track directions (directions a and b of FIGS. 6 and 7). The track on the optical card is normally divided into a plurality of sectors, and managed. Therefore, at the time when the light beam from the recording LD 50 reaches the sector which is to be recorded first, the light beam is modulated by the recording signal. Also, light emission is started by a high recording power sufficient to record the signal.

At this time, the control unit 152 outputs values, which correspond to the stored values of FES2 and TES2, to the D/A converters 154 and 155. Due to this, the outputs of the D/A converters 154 and 155 are added to the adders 148 and 149 of the differential amplifiers 150 and 151. At the same time, the control unit 152 controls the selector 146 to select FES1 and TES1. In this way, similar to the prior art, the recording light spot is controlled in the focus and tracking directions based on the focus and tracking error signals FES1 and TES1 obtained from the reproducing light spot. However, since a value for canceling the offset is added to the servo control system through the D/A converters 154 and 155, the position of the recording light spot is precisely corrected. Thereby, it is possible to perform the same control as the case that the recording light spot is based on the focus and tracking error signals FES2 and TES2 obtained from the recording light spot.

RECORDING OPERATION

In this embodiment, the recording operation is performed as the following.

As shown in FIGS. 6 and 7, when the optical card 64 is moved in a direction of the arrow a, the pit 72, which is formed by the recording light spot 68, is moved inside of the spot 110 formed by the zeroth diffracted light of the reproducing light beam. Then, if the pit 72 reaches the position of the spot 110, the variation of the amount of light is generated on the data detection device 122 on the reproducing PD 118 by the image of the pit 72. The data detection device 122 detects the variation of the amount of light and outputs a reproducing signal, which is right after the recording.

Moreover, when the optical card 64 is moved in a direction of an arrow b, the pit 72, which is formed by the recording light spot 68, is moved inside of the spot 108 formed by the primary diffracted light of the reproducing light beam. Due to this, the variation of the amount of light is generated on the data detection device 126 on the reproducing PD 118 by the image of the pit 72. The reproducing signal, which is right after the recording, can be obtained from the variation of the amount of light. Therefore, even if the optical card is moved in either direction of arrow a or b, the reproducing signal, which is right after the recording, can be obtained.

In other words, regardless of the direction where the optical card reciprocates relative to the optical head, the so-called verify operation, which immediately checks the recording state by the reproducing light beam, can be performed. Therefore, as compared with the conventional data recording/reproducing apparatus of a two-light source type in which the verify operation can be performed in the movement of only one way direction, execution recording speed can be substantially doubled.

If the recording operation to the optical card 64 is ended, and the recording operation to the object track and object sector is ended, that is, the operation is performed with any timing described below:

1. when the relative movement for the recording operation between the optical card and the optical head is ended, and the optical card is stopped;
2. when the transfer speed of the optical card is reduced from the constant speed since the optical card is stopped; and
3. after a command execution result is returned to the host computer.

If the operation is performed with any timing described above, the input of the D/A converter is set to zero, and the operation is returned to mode 1 so as to perform the control of the position of the reproducing light spot by using the FES and TES formed from only the reproducing light. However, in a case that it is instructed from the host computer that the recording operation is continuously performed to the plurality of tracks, the operation is not returned to mode 1, and the control is performed as the state of mode 4 is maintained.

FIRST MODIFICATION

Figure 8:
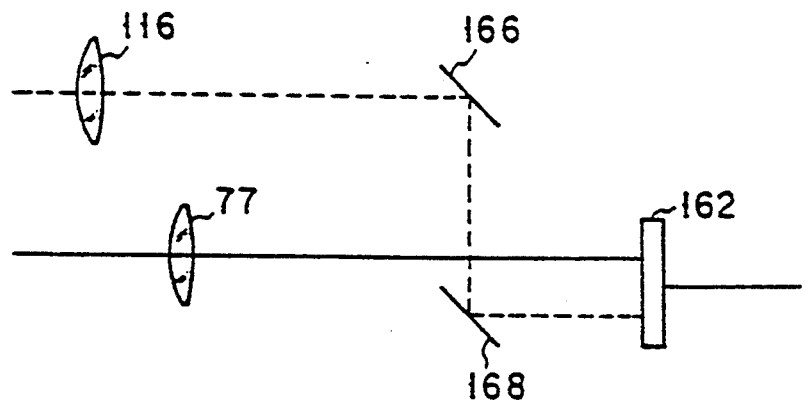
FIG. 8 is a partial structural view showing a modification of the apparatus of the first embodiment.

A first modification of the first embodiment will be explained. In the first embodiment, the reproducing light PD and the recording light PD were separated from each other. However, as shown in FIG. 8, these photodetectors may be replaced with a PD 162 in which the reproducing light PD and the recording light PD are incorporated. In this case, two mirrors 166 and 168 are arranged in the optical path, and light flux, which is focused by the focusing lens 116, may be guided to PD 162.

SECOND MODIFICATION

Figure 9:
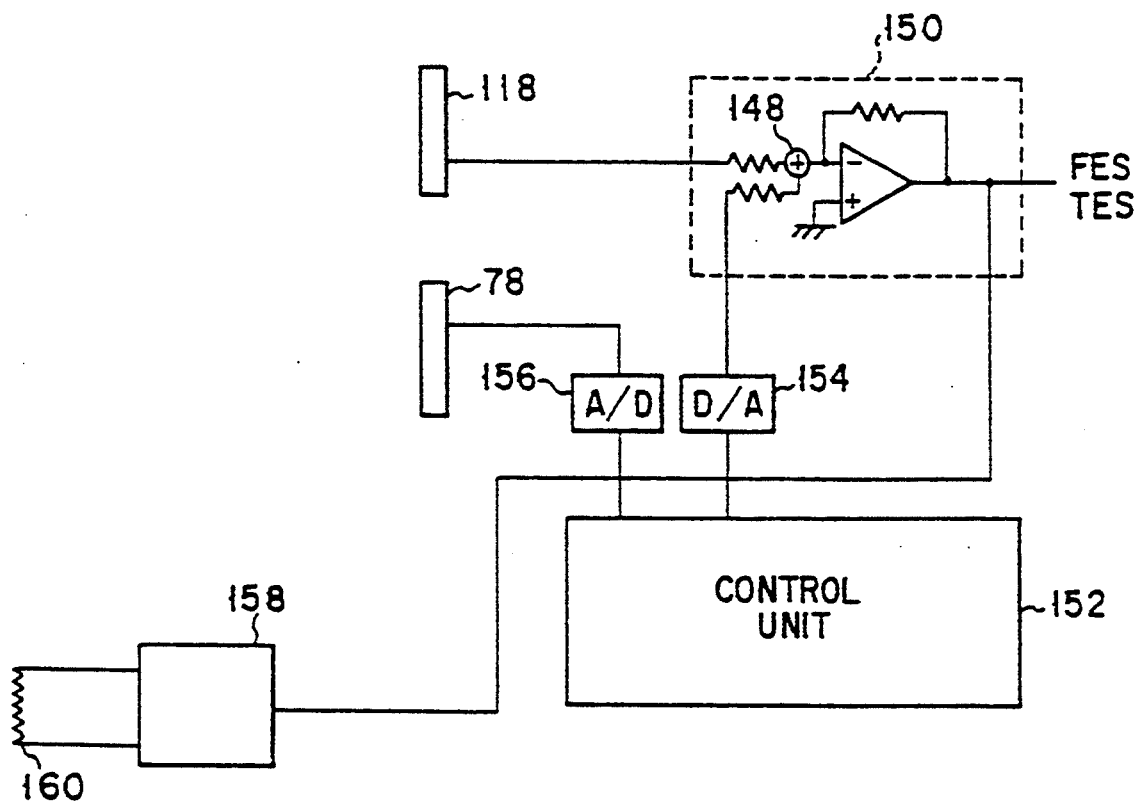
FIG. 9 is a partial structural view showing another modification of the apparatus of the first embodiment.

A second modification of the first embodiment will be explained. In this modification, as shown in FIG. 9, the input of the A/D converter 156 is connected not to the output of the differential amplifier 150 but to the output of the recording PD 78. The output of the differential amplifier 150 is directly connected to the objective lens actuator 160 and the optical head actuator (not shown). The A/D converter 156 converts FES and TES formed by the recording light to digital data, and outputs digital data to the control unit 152. It is noted that the structure of the optical head 143 (FIG. 4) is the same as that of the first embodiment, and illustration and explanation are omitted.

The operation of the above modification will be explained as follows:

Since the focus control and tracking control are performed by only the output of the reproducing PD 118 at the time of data reproduction, the control unit 152 outputs zero to the D/A converter 154.

At the time of data recording, the recording LD is emitted just before the recording operation with intensity, which is in the range that no pit is formed in the recording medium. Then, the output of the recording PD 78 is A/D-converted, and the obtained value is temporarily stored in the control unit 152. At this time, since the focus control and tracking control are performed by reproducing light, FES and TES formed by the reproducing light are substantially zero. Therefore, the output of the recording PD 78 shows the amount of shift of the recording light beam to the reproducing light beam.

The control unit 152 outputs data to the D/A converter 154 such that the output of the recording PD 78 is set to zero, and controls the operation so as to obtain suitable focus state of the recording light beam and tracking state. The following operations of the modifications are the same as those of the first embodiment.

In the above embodiment and two modifications, the focus detection system was performed by the off-axis method. However, an astigmatism method or a critical angle method, and other methods may be used. Moreover, in the above embodiment and two modifications, the reproducing light beam is expanded in a direction where the beam crosses the tracks by the cylindrical lens so as to simultaneously illuminate the plurality of tracks by use of LD as a light source. However, as disclosed in the prior art, an LED may be used as a light source and a circular beam may be formed. Or, the reproduction may be performed by illuminating one track.

2. Second Embodiment

A second embodiment will be explained with reference to FIGS. 10 to 12B. In this embodiment, a general method is used to perform the focus control, and the technical concept of the present invention is applied to only the tracking control.

OPTICAL HEAD

Figure 1:
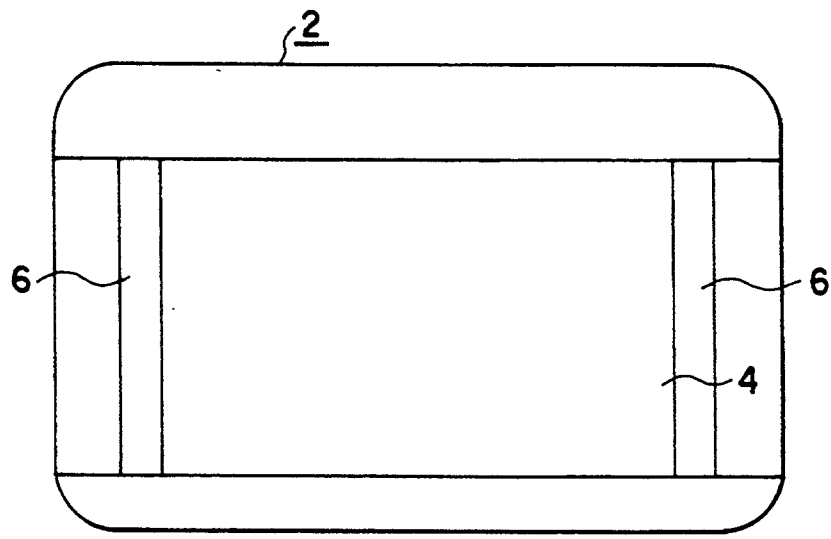
FIG. 1 is an upper front view of an optical card to be used in a conventional data recording/reproducing apparatus.
Figure 2:
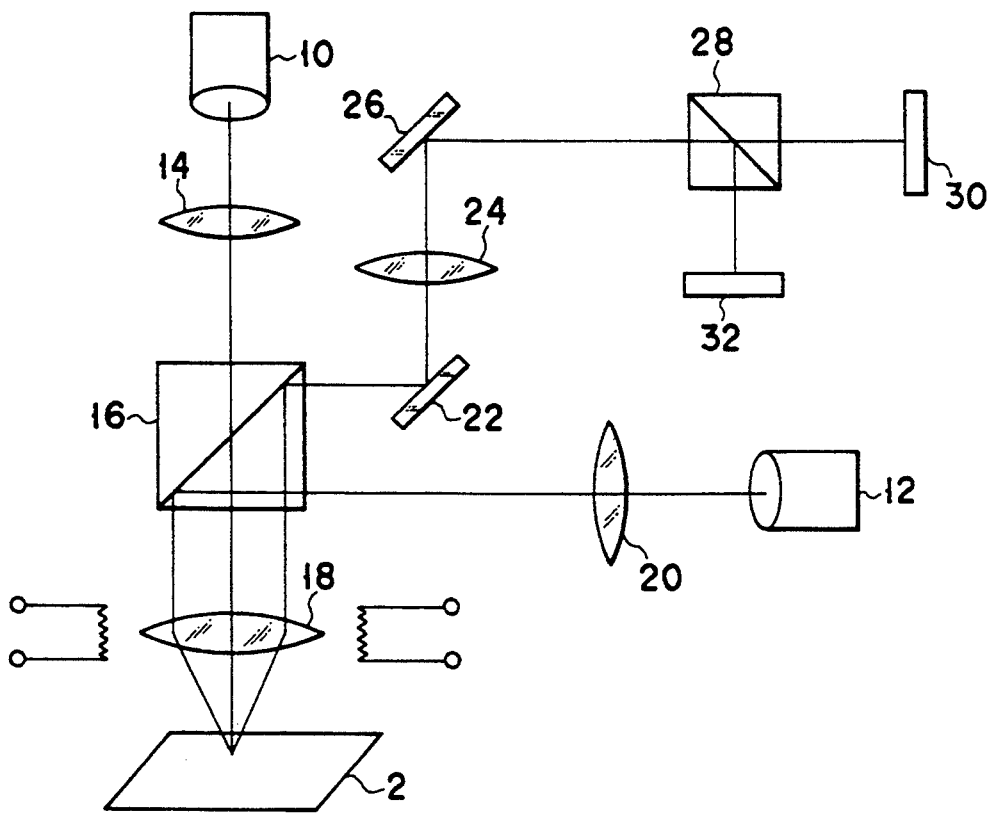
FIG. 2 is a structural view showing an optical head used in the conventional recording/reproducing apparatus.
Figure 3:
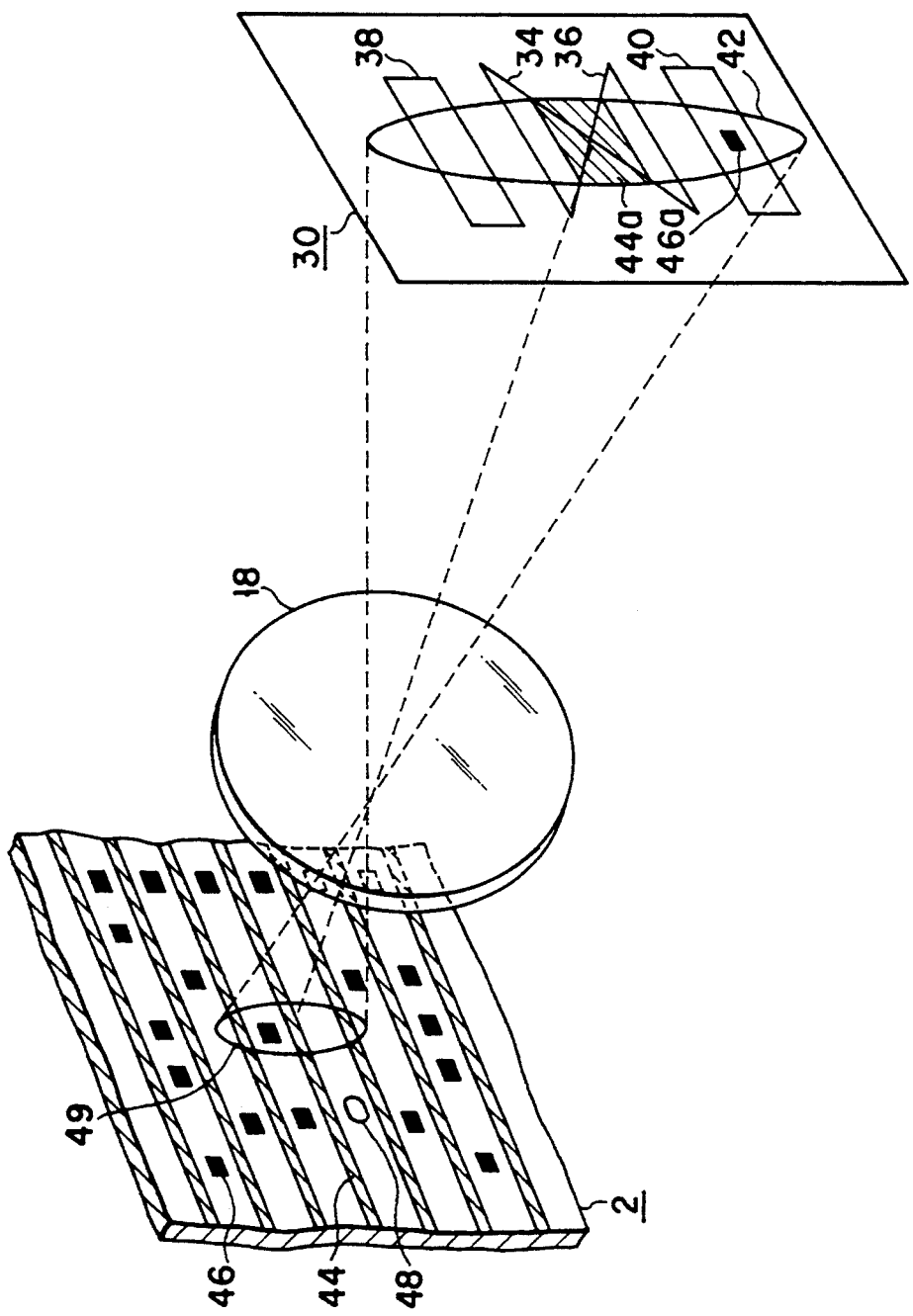
FIG. 3 is a schematic perspective view showing the optical card and a tracking PD in the conventional apparatus.

The structure of the optical head of this embodiment is substantially the same as that of the apparatus shown in FIGS. 3 and 4. Therefore, only the structure different from the structure of the above apparatus will be explained, and the same reference numerals as used in the first embodiment are added.

Figure 10:
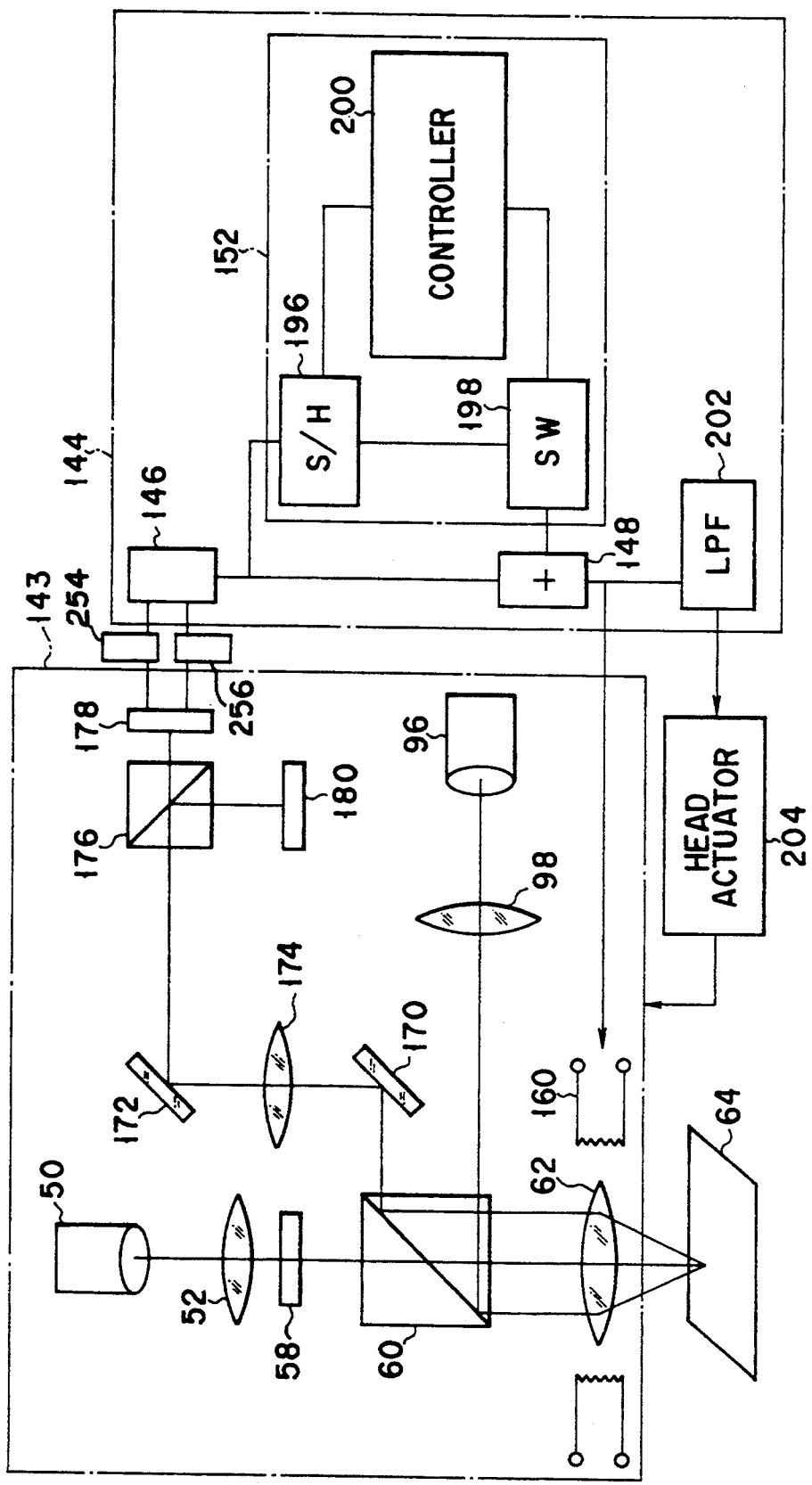
FIG. 10 is a structural view showing an optical head and a control system, which are incorporated into an optical data recording/reproducing apparatus of a second embodiment according to the present invention.

As shown in FIG. 10, on the optical path of the emitted light from the recording LD 50, the diffraction grating 58 diffracting the emitted light is arranged between the collimator lens 52 and PBS 60. The diffraction grating 58 is used to perform the tracking detection at the time of recording by a three beam method. The diffraction grating 58 diffracts the recording light beam into the zeroth diffracted light beam and the ± primary diffracted light beams which are used in the three beam method.

Two mirrors 170 and 172 and an image forming mirror 174 arranged between mirrors 170 and 172 are provided on the reflection light path from the optical card 64. Moreover, a beam splitter 176 is arranged on the optical path ahead of the mirror 172, and the reflected light beam from the optical card 64 is divided by the beam splitter 176, and one light beam is inputted to a tracking PD (Tr-PD) 178, and the other light beam is inputted to a focus PD (Fo-PD) 180.

Figure 11:
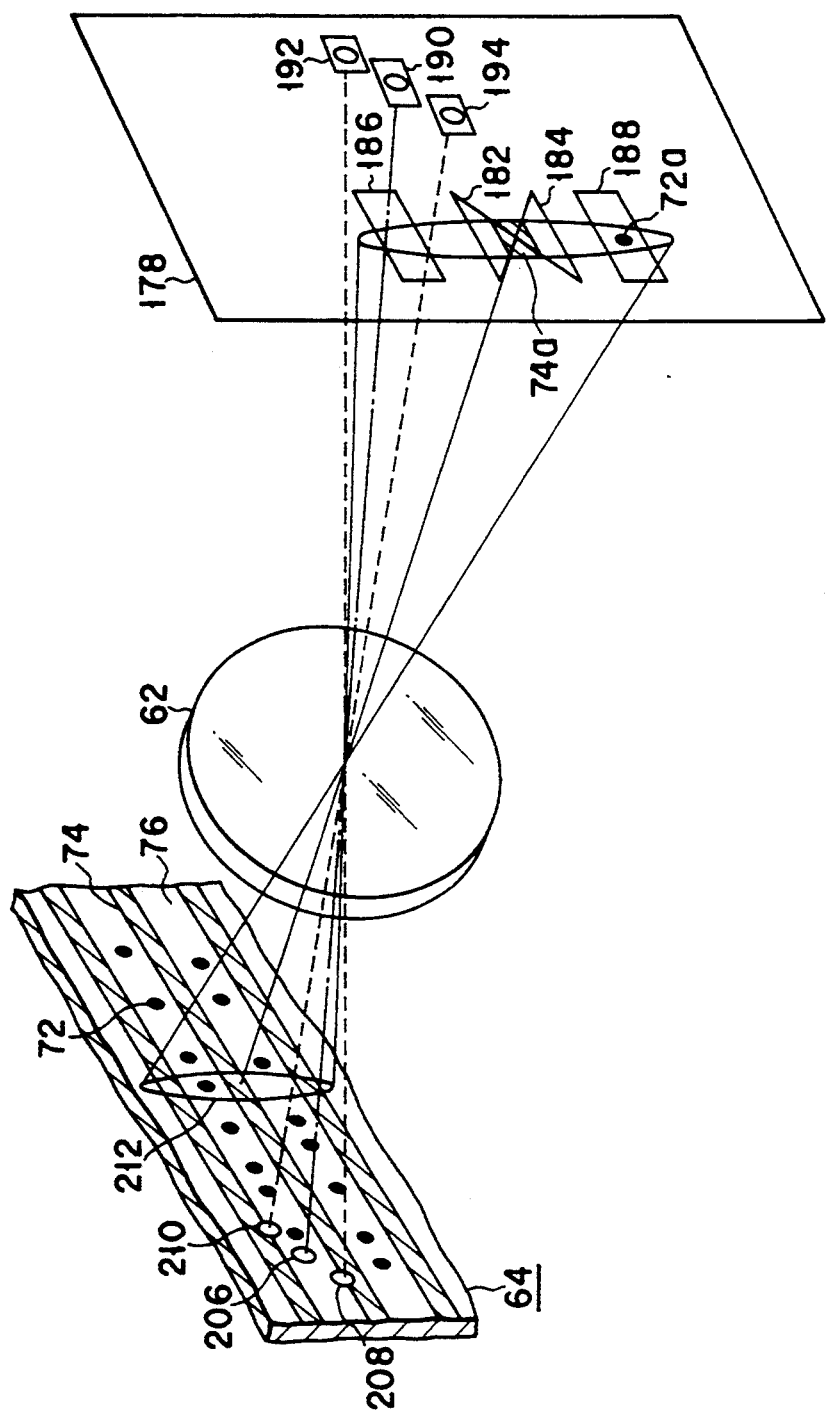
FIG. 11 is a schematic perspective view showing an optical card and a Tr-PD in the apparatus of FIG. 10.

As shown in FIG. 11, Tr-PD 178 comprises four photodetectors 182, 184; 186, 188 for reproduction. Among four photodetectors, two photodetectors 182, 184 for detecting a reproduction tracking error signal (hereinafter called "reproduction error PD") are arranged in a triangular form such that their apexes are facing to each other.

Two data detection PDs 186 and 188 for the reproduction signal, which are respectively formed rectangular, are arranged on the upper and lower portions of the reproduction error PDs 182 and 184.

Tr-PD 178 comprises three recording photodetectors 190, 192, 194. These three recording photodetectors 190, 192, and 194 are arranged in an oblique alignment manner. The central photodetector 190 is a photodetector for a recording signal (hereinafter called "recording PD"). The upper and lower photodetectors 192 and 194 are photodetectors for detecting a recording tracking error signal (hereinafter called "recording error PD").

CONTROL SYSTEM

As shown in FIG. 10, first and second operational amplifiers 254 and 256 are electrically connected to Tr-PD 178. The first operational amplifier 254 outputs a differential signal between two reproduction error PDs 182 and 184, and the second operational amplifier 256 outputs a differential signal between two recording error PDs 192 and 194. The outputs of the first and second operational amplifiers 254 and 256 are electrically connected to the selector 146. The selector 146 selects either of the output signals of two operation amplifiers 254 and 256, and outputs the elected signal.

The output of the selector 146 is connected to the adder 148 and an input of a voltage sample and hold circuit (hereinafter called "S/H circuit") 196, respectively. The output of the S/H circuit 196 is connected to a switch 198, and an output of the switch 198 is connected to the adder 148. The S/H circuit 196 holds an input signal in an analog manner in this embodiment. However, it is possible to AD-convert the incoming signal by the A/D converter, and to digitally hold the converted signal.

The S/H circuit 196 and the switch 198 are controlled by a controller 200. The holding timing and the timing of outputting the held value are controlled by the controller 200, and the on-off timing of the switch 198 is also controlled by the controller 200. The S/H circuit 196, the switch 198, and the controller 200 constitute a control unit 152.

It is noted that the timing of the switch of the selector 146 is also controlled by the controller 200 (this is not illustrated).

The adder 148 is connected to the objective lens actuator 160 for driving the objective lens 62. Also, the adder 148 is electrically connected to an optical head actuator 204 for driving the whole optical head 143 through a low pass filter 202.

CONTROL OPERATION

The process for detecting the shift of the recording light spot and that of the reproducing light spot will be explained as follows:

If instruction of recording is given to the apparatus, the selector 146 is switched by the controller 200 to select the signal from the second operational amplifier 256. This switching is performed at a timing since the command of the instruction of recording is given till the recording beam is emitted with power enough to form a pit in the optical card.

For example, similar to the first embodiment, this operation is performed with any timing described below:

1. just after receiving the command;
2. during seek control of the optical head to an object track;
3. during the time till a transfer speed at the time of reciprocating the optical card is made constant; and
4. at the time when the optical card stops at the driving end.

In order to correct the tracking shift of the recording light spot, a light beam having weak power almost the same as the power of a reproduction light beam is emitted from the recording LD 50. The emitted light beam passes through the collimator lens 52, and is diffracted by the diffraction grating 58. The resultant zeroth diffracted light beam is used as a recording signal, and ± primary diffracted beams light are used to control the recording signal light beams to a predetermined position. The zeroth diffracted light beam and ± primary diffracted light beams pass through PBS 60, and form recording light spots on a predetermined track of the optical card 64 by the objective lens 64, respectively. In FIG. 11, reference numeral 206 denotes an optical spot formed by the zeroth diffracted light beam and positioned at the central portion, that is, a recording light spot. Reference numerals 208 and 210 denote optical spots formed by ± primary diffracted light beams and positioned at the upper and lower sides, that is, error light spots. The central recording light spot 206 is inputted to the recording device 190 through various optical systems, and the error light spots 208 and 210 are inputted to the recording error DPs 192 and 194. By use of the recording error DPs 192 and 194, the tracking shift of the recording light spot 206 is detected. This detection is performed by the conventional three beam method. This method is well-known and the explanation is omitted.

In a case that the recording light spot 206 is shifted from the suitable position on the track 76, the following operation is performed.

The signal sent from the second operational amplifier 256 is transmitted to the selector 146. At this time, the selector 146 supplies a voltage to the objective lens actuator 160 and the optical head actuator 204, and moves the objective lens 62 and the entire optical head 143.

In a case that there is no tracking shift of the recording light spot, the objective lens 62 and the optical head 143 are not moved, and the position of the light spot is maintained. In this manner, the tracking shift of the recording light spot is temporarily corrected. The state that the tracking shift of the recording light spot is corrected, that is, the suitable position of the recording light spot is held, is maintained till the optical head actuator 204 is driven when the tracking control of the reproducing light spot is performed.

Sequentially, a light beam having power for reproduction is emitted from the reproduction LD 96, the output of the selector 146 is switched to the reproduction error PDs 182 and 184. The emitted light beam, as shown in FIG. 10, passes through the collimator lens 98 and PBS 60, and is irradiated on the optical card 64 by the objective lens 62. The irradiated reproducing light spot is shown by reference numeral 212 of FIG. 11.

Figure 12A:
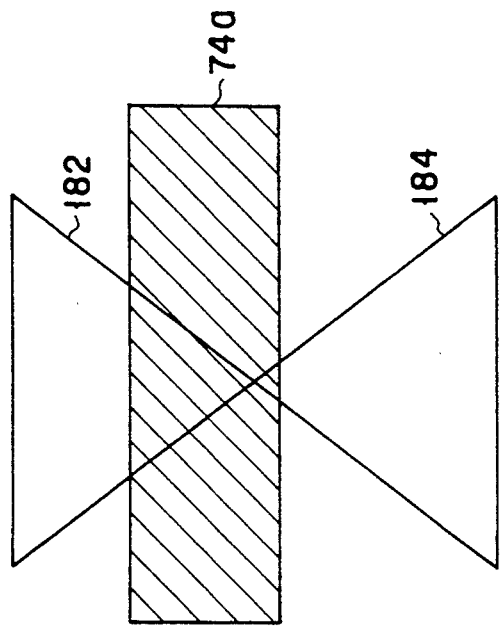
FIG. 12A is an upper front view showing a state where an image of a guide track is formed on a reproducing error device in a case that no tracking shift occurs in the reproducing light spot.

The image of the reproducing light spot 212 is formed on the reproduction error PDs 182 and 184 and reproducing devices 186 and 188 of the Tr-PD 178. At this time, the image 74a of the guide track 74 is formed on the reproduction error PDs 182 and 184. If there is no tracking error in the reproducing light spot, the image 74a of the guide track 74 is formed as shown in FIG. 12A, and the outputs of the PDs 182 and 184 are equal to each other.

Figure 12B:
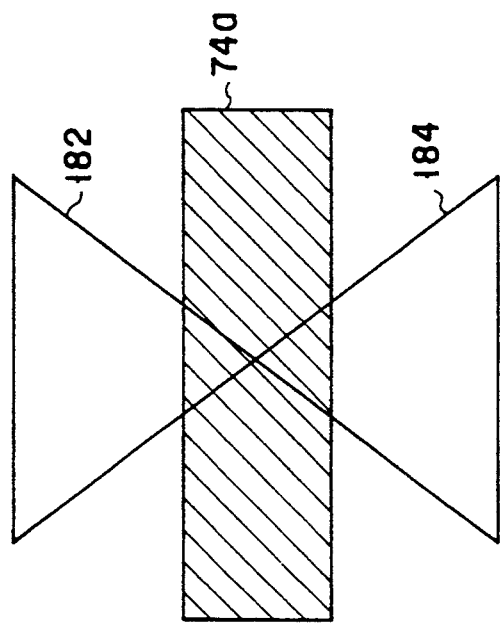
FIG. 12B is an upper front view showing a state where an image of a guide track is formed on a reproducing error device in a case that a tracking shift occurs in the reproducing light spot.

However, if there is a tracking error in the reproducing light spot, the image 74a of the guide track is formed as shown in FIG. 12B, and the outputs of the PDs 182 and 184 are different from each other.

The recording light spot is tracking-controlled. Therefore, a difference (referred as a numeral "C") between the outputs of the reproduction error PDs 182 and 184 shows an amount of shift between the reproducing light spot and the recording light spot. The difference C is held by the voltage of the S/H circuit 196 in a case that the outputs of the PDs 182 and 184 are different from each other (in the case that the outputs of the PDs 182 and 184 are equal to each other, zero is maintained as a voltage value).

Next, a voltage having a level sufficient to correct the difference C is applied to the objective lens actuator 160 and the optical head actuator 204 to move the objective lens 62 and the entire optical head 143, and the tracking control of the reproducing light spot is performed. As a result, the reproducing light spot is moved to the suitable position on the track, and the amount of the tracking shift is corrected. In a case that the difference C is zero, no voltage is applied to the objective lens actuator 160 and the optical head actuator 204. In other words, zero voltage is applied to the objective lens actuator 160 and the optical head actuator 204. Therefore, no tracking shift state is maintained.

When the tracking shift of the reproducing light spot is corrected, the recording light spot is shifted from the center of the track. For positioning the recording light spot at the center of the track, the controller 200 supplies a clock signal to the S/H circuit 196, and turns on the switch 198. Then, the value, which is held by the S/H circuit 196, is inputted to the adder 148 (FIG. 10) as an offset value.

The recording light spot is shifted by the amount of shift between the reproducing light spot and the recording light spot as performing the tracking control of the reproducing light spot. Thereby the tracking shift of the recording light shift can be corrected. However, during this time, the reproducing light spot is shifted from a predetermined position (data reading position). Due to this, at the time when the recording is ended, the switch 198 is turned off to end the process for adding the offset value, so that the operation is returned to the tracking control of the normal reproducing light spot again.

In a case that the switch of the entire apparatus is turned off and neither recording nor reproducing is performed, that is, the operation of the apparatus is in a standby state, the tracking control of the reproducing light is being performed.

Opposite to the above embodiment, the tracking shift of the reproducing light spot may be corrected based on the amount of shift between both spots as performing the tracking control of the recording light spot. However, the reproducing light spot, which illuminates the larger area than the recording light spot, has a large irradiation area and a large controllable range, so that the spot does not easily deviate from the center of the predetermined track.

In the above embodiment, the amount of shift is electrically corrected. However, it is possible to provide a driving device such as a piezoelectric element in the recording LD 50 shown in FIG. 10, and drive the driving device based on the differential signal C, which is proportional to the amount of shift, thereby moving the position of the recording light spot on the optical card. As mentioned-manner, the object of the present invention can be attained.

In the first embodiment and two modifications, the differential voltage is A/D-converted, and the converted voltage is inputted to the control unit 152. However, it is possible to replace the control unit 152 of FIG. 4 with the control unit 152 of FIG. 10 without A/D conversion. In this case, seeing from the reproducing operation, the focus position of the reproducing light beam is slightly shifted by the correction. However, since the focus position in the case of reproduction has a large degree of margin, the reproduction operation can be performed without problem.

Opposite to the second embodiment, it is possible to apply the concept of the invention only to the focus control and to apply the prior art to the tracking control.

In the above embodiments, means for detecting an offset amount is provided in the optical recording/reproducing apparatus. However, it can be provided outside the apparatus. For example, in the case of shipment of the apparatus, it is acceptable that the detecting means outside the apparatus is connected to the apparatus to detect the offset value and store the detected value in the memory means inside the apparatus before the shipment. After that, the detecting means is detached from the apparatus to ship it.

As mentioned above, according to the present invention, by adding a simple circuit, it is possible to control the shift of the focus position between the recording light and reproducing light, which is generated by the ambient temperature change or secular change, and the shift of the tracking position, and thereby the recording operation can be performed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical data recording apparatus, which irradiates light beams to a recording medium having a plurality of tracks and provides at least data recording to said recording medium, comprising:

first light source means for emitting light including a recording light beam;

second light source means for emitting a light beam having a power weaker than said recording light beam;

error signal detection means having error signal detection means for detecting at least one of:

a track error signal showing a shift between an irradiation position of a light beam sent from said second light source means to said recording medium and a position of one of said tracks, and a focus error signal showing a shift between a focal position of a light beam from said second light source means and a position of said recording medium;

control means for controlling at least one of an irradiation position, and a focal position of said recording light beam to said recording medium, based on at least one of the track error signal and the focus error signal detected by said error signal detection means; and memory means for storing a correction value for canceling a shift of at least one of the irradiation position of said recording light beam and the focal position of said recording light beam in response to emission of a light beam from said first light source means onto said recording medium, at least one of said shifts being generated when at least one of the irradiation position and the focal position of said recording light beam to said recording medium is controlled based on at least one of the track error signal and focus error signal detected by said error signal detection means, and said correction value being added to at least one of the track error signal and the focus error signal by said control means.

2. An apparatus according to claim 1, wherein said light beam emitted from said second light source means is a reproducing light beam reproducing data of said recording medium.

3. An apparatus according to claim 1, wherein said error signal detection means include a plurality of photodetectors which are formed on a same plane.

4. An apparatus according to claim 1, wherein a light beam sent from said second light source means irradiates the plurality of tracks on said recording medium.

5. An apparatus according to claim 1, wherein light sent from said first light source means and a light beam sent from said second light source means are focused by an objective lens.

6. An optical data recording apparatus, which irradiates light beams to a recording medium having a plurality of tracks and provides at least data recording to said recording medium, comprising:

first light source means for emitting light including a recording light beam;

second light source means for emitting a light beam having a power weaker than said recording light beam;

first error signal detection means having error signal detection means for detecting at least one of:

a track error signal showing a shift between an irradiation position of light, other than said recording light beam, sent from said first light source means to said recording medium and a position of one of said tracks, and a focus error signal showing a shift between a focal position of light, other than said recording light beam, from said first light source means and a position of said recording medium;

second error signal detection means having error signal detection means for detecting at least one of:

a track error signal showing a shift between an irradiation position of a light beam sent from said second light source means to said recording medium and a position of one of said tracks, and a focus error signal showing a shift between a focal position of a light beam from said second light source means and a position of said recording medium;

light beam control means for controlling at least one of the irradiation position, and the focal position of said light beam, which is sent from at least one of said first and second light source means to said recording medium, based on at least one of the track error signal and the focus error signal detected by at least one of said first and second error signal detection means;

memory means for storing an output value of said first error signal detection means, and control means for controlling said light beam control means to control at least one of the irradition position and the focal position of said light beam of said second light source means, giving an instruction for emitting a light beam from said first light source means in order that said memory means stores the output value of said first error signal detection means, and reading out the value stored in said memory means when said first light source means emits said recording light beam to allow said light beam control means to control at least one of the irradiation position and the focal position of said recording light beam to said recording medium based on the stored value in said memory means and on an output value of said second error detection means.

7. An apparatus according to claim 6, wherein the light other than said recording light beam, which is emitted from said first light source means after controlling said light beam control means to control at least one of the irradiation position and the focal position of a light beam from said second light source means to said recording medium, has a power weaker than a power for destroying data on said recording medium.

8. An apparatus according to claim 6, wherein when said control means instructs said second light source means to emit a light beam and said memory means to store the output value of said first error signal detection means, said light control means is controlled by said control means to continuously control at least one of the irradiation position and the focal position of a light beam sent from said first light source means to said recording medium.

9. An apparatus according to claim 6, further comprising selector means for selectively outputting the focus and tracking error signal detected by said first error signal detection means and the focus and tracking error signal detected by said second error signal detection means.

10. An apparatus according to claim 9, wherein said selector means outputs one of the focus error signal detected by said first error signal detection means and the focus error signal detected by said second error signal detection means to a first output terminal, and outputs one of the tacking error signal detected by said first error signal detection means and the tracking error signal detected by said second error signal detection means to a second output terminal.

11. An apparatus according to claim 10, wherein said first and second output terminals are respectively connected to differential amplifiers each having an input terminal.

12. An apparatus according to claim 11, wherein the output of said memory means is connected to each input terminal of said differential amplifiers.

13. An apparatus according to claim 6, wherein said first and second error signal detection means respectively include a plurality of photodetectors which are formed on a same plane.

14. An apparatus according to claim 6, wherein a light beam sent from said second light source means irradiates the plurality of tracks on said recording medium.

15. An apparatus according to claim 6, wherein light sent from said first light source means and a light beam sent from said second light source means are focused by an objective lens.

16. An optical data recording apparatus, which irradiates light beams to a recording medium having a plurality of tracks and provides at least data recording to said recording medium, comprising:

first light source means for emitting light including a recording light beam;

second light source means for emitting a light beam having a power weaker than said recording light beam;

first error signal detection means having error signal detection means for detecting at least one of:

a track error signal showing a shift between an irradiation position of light—other than said recording light beam, sent from said first light source means to said recording medium and a position of one of said tracks, and a focus error signal showing a shift between a focal position of said light beam, other than said recording light beam, from said first light source means and a position of said recording medium;

second error signal detection means having error signal detection means for detecting at least one of:

a track error signal showing a shift between an irradiation position of a light beam sent from said second light source means to said recording medium and a position of one of said tracks, and a focus error signal showing a shift between a focal position of a light beam from said second light source means and a position of said recording medium;

light beam control means for controlling at least one of the irradiation position and the focal position of said light beam, which is sent from at least one of said first and second light source means to said recording medium, based on at least one of the track error signal and the focus error signal detected by at least one of said first and second error signal detection means;

memory means for storing an output value of said second error signal detection means; and control means for controlling said light beam control means to control at least one of the irradiation position and the focal position of said other light of said first light source means, giving an instruction for emitting a light beam from said second light source means in order that said memory means stores the output value of said second error signal detection means, and reading out the value stored in said memory means when said first light source means emits said recording light beam to allow said light beam control means to control at least one of the irradiation position and the focal position of said recording light beam to said recording medium based on the value stored in said memory means and on an output value of said second error detection means.

17. An apparatus according to claim 16, wherein the light other than said recording light beam, which is emitted from said first light source means after controlling said light beam control means to control at least one of the irradiation position and the focal position of a light beam from said second light source means to said recording medium, has a power weaker than a power for destroying data on said recording medium.

18. An apparatus according to claim 16, further comprising selector means for selectively outputting the focus and tracking error signal detected by said first error signal detection means and the focus and tracking error signal detected by said second error signal detection means.

19. An apparatus according to claim 18, wherein the output of said selector means is connected to sample and hold circuit means for storing a value of the output of said second error signal detection means.

20. An apparatus according to claim 16, wherein said first and second error signal detection means respectively include a plurality of photodetectors which are formed on a same plane.

21. An apparatus according to claim 16, wherein a light beam sent from said second light source means irradiates the plurality of tracks on said recording medium.

22. An apparatus according to claim 16, wherein light sent from said first light source means and a light beam sent from said second light source means are focused by an objective lens.

23. A method for optically recording and reproducing data including steps of:

a first step of driving one of two light sources to irradiate first light having power, which is weaker than a power for destroying data on a data recording medium, to said data recording medium and controlling a position of said first light based on reflected light of said first light;

a second step of driving the other light source to irradiate second light having power, which is weaker than the power for destroying data on the data recording medium, to said data recording medium and detecting a positional error signal of said second light based on reflected light of said second light;

a third step of storing the positional error signal detected in said second step in memory means;

a fourth step of driving one of said light sources driven in said first step to irradiate the first light, which has the power weaker than the power for destroying data on the data recording medium, to said data recording medium together with driving the other light source to irradiate third light, which has a power capable of recording data on said data recording medium, to said data recording medium, and controlling a position of said third light based on the reflected light of said first light and a stored value of said memory means obtained in said third step.

* * * * *